Patented Sept. 8, 1931

1,821,970

UNITED STATES PATENT OFFICE

WILLIAM HENRY HANNAY AND FREDERICK ERIC LEE, OF TADANAC, BRITISH COLUMBIA, CANADA, ASSIGNORS TO THE CONSOLIDATED MINING AND SMELTING COMPANY OF CANADA, LIMITED, OF MONTREAL, CANADA, A COMPANY OF CANADA

ELECTRODEPOSITION OF METAL

No Drawing.   Application filed February 21, 1929.   Serial No. 341,829.

Our invention relates to an improvement in the art of the electrodeposition of metals and particularly to the deposition of zinc from sulphate solutions. In the electrolytic recovery of zinc from ores, concentrates, and metallurgical products, the zinc is ordinarily brought into solution as zinc sulphate and the solution thus obtained usually contains such elements as manganese, cobalt, nickel, iron, copper, cadmium, arsenic, antimony, silver, gold, lead, bismuth, thallium, selenium, tellurium, all of which may, in a zinc sulphate solution, be classed as impurities. With the exception of manganese these impurities, or any metal other than zinc which may be present in the solution and detrimental to the deposition of reguline zinc, are removed as completely as possible, before electrolysis, by well known purification methods.

In the electrodeposition of zinc from sulphate solutions manganese is not classed as a detrimental impurity, but heretofore when a lead anode was used, in the electrolytic stage of the operation, the zinc deposited at the cathode contained lead, in small but important amounts, which was present not by reason of inadequate purification but through the formation at the anode of soluble lead compounds or the mechanical entrainment of minute particles of precipitated manganese dioxide containing relatively substantial amounts of lead or oxides of lead detached from the anode by its disintegration during the electrolysis.

During our investigations we discovered that the formation of soluble lead compounds and the disintegration of the lead anode was largely, if not wholly, due to anodic polarization, and having ascertained that fact we sought for and obtained a depolarizer, which when present in the electrolyte, in proper amount, succeeded, with greater or less efficiency, in preventing this formation and disintegration, and in substantially reducing the lead content of the deposited metal.

Our invention therefore relates to an economic process or method, for the electrodeposition of such metals as zinc or cadmium from a hydrometallurgical solution, which comprises having a weak depolarizer present in the solution for decreasing the formation of soluble lead compounds and decreasing the disintegration of the anode, thereby substantially reducing the lead content of the deposited metal without appreciably affecting the current efficiency.

Several substances can be used as depolarizers but iron, because it is alternately converted from ferrous to ferric state and can be readily controlled, is the most desirable for the purpose, and can be added to the electrolyte after purification as ferrous or ferric sulphate, or the plant purification system may, under certain conditions be so regulated as to permit the requisite amount of iron to pass through the purification stage. In using this depolarizer for the treatment of sulphate solutions of zinc and also of sulphate solutions of cadmium it is necessary to adjust the amount of iron present in the electrolyte and regulate this adjustment to the metal content of the solution, and the amount of iron present in it after purification. In determining this adjustment for the treatment of zinc sulphate solutions containing 140 grams of zinc per liter we added iron in various quantities ranging from 10 to 100 milligrams per liter and with these adjustments obtained current efficiencies ranging from 99.8 to 97.1 and corresponding reductions of lead at the cathode ranging from 0.031 to 0.009, and to verify these determinations and definitely ascertain the commercial value of the process we prepared a zinc sulphate electrolyte by adding a large excess of atomized zinc dust to a solution of distilled water and chemically pure sulphuric acid in order that no other metal or impurities would be present, and we conducted a series of tests by adding for each test a different quantity of iron to this electrolyte with results as per the following table:

| No. | FeMgs/L | Per cent current eff. | Pb in cathode |
|---|---|---|---|
| 1 | None | 100.00 | 0.052 |
| 2 | 10 | 99.8 | .031 |
| 3 | 20 | 98.8 | .016 |
| 4 | 40 | 99.4 | .010 |
| 5 | 60 | 99.6 | .009 |
| 6 | 80 | 97.8 | .008 |
| 7 | 100 | 97.1 | .009 |

The current efficiencies being calculated in terms of No. 1.

We also prepared similar sulphate solutions of cadmium, with corresponding economic results.

In all of these tests we observed that when the solution contained an insufficient amount of iron the anode was coated with a non-adherent dark brown deposit of lead peroxide ($PbO_2$), and that this deposit, during the electrolysis, became detached from the anode and remained in suspension, through the electrolyte, thereby facilitating its entrainment on the cathode, and that in those tests where the solution contained the desired amount of iron the anode was coated with a black deposit, possibly a lower oxide of lead, which firmly adhered to the anode, and that the deposited metal from these latter tests was of greater purity than from those containing an insufficient amount of iron.

Having thus fully described our invention what we claim as new and desire to secure by Letters Patent is:

1. A hydro metallurgical process for the electrodeposition of zinc from a sulphate solution which comprises, when using a lead anode in the electrolysis, having iron present in the solution as a weak depolarizer, the proportion of iron to the metal in solution ranging from 10 to 100 milligrams of iron per liter to 140 grams of the metal in solution per liter.

2. A hydro metallurgical process, involving the use of a lead anode in the electrolytic deposition of zinc from a sulphate solution in which iron is present, comprising the step of adjusting the amount of iron in the soluton for the formation of a coating, possibly a lower oxide of lead, which will firmly adhere to the anode, and so regulating the adjustment as to avoid a material lowering of the current efficiency during the electrolytic reaction.

3. A hydro metallurgical process involving the use of a lead anode in the electrolytic deposition of zinc, from a sulphate solution containing iron, which comprises the step of inhibiting the disintegration of the anode and the formation of soluble lead compounds by adjusting the amount of iron to the depositable metal present in the sulphate solution.

4. A hydro metallurgical process involving the use of a lead anode in the electrolytic deposition of zinc, from a sulphate solution containing iron, which comprises the step of inhibiting anodic polarization by adjusting the amount of iron to the depositable metal present in the sulphate solution.

Dated at Tadanac, in the district of Kootenay, and Province of British Columbia, Dominion of Canada, this 29th day of November, 1928.

WILLIAM HENRY HANNAY.
FREDERICK ERIC LEE.